US010681048B1

(12) United States Patent
Feinberg et al.

(10) Patent No.: US 10,681,048 B1
(45) Date of Patent: Jun. 9, 2020

(54) SYSTEMS AND METHODS FOR INTERCEPTING WEBVIEW TRAFFIC

(71) Applicant: JPMorgan Chase Bank, N.A., New York, NY (US)

(72) Inventors: Alexander Feinberg, Staten Island, NY (US); Jonathan Seungtae Ra, Ridgewood, NJ (US); Victoria Christy Sathya Rajasekar, Bayonne, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/200,200

(22) Filed: Nov. 26, 2018

(51) Int. Cl.
*G06F 15/173* (2006.01)
*H04L 29/06* (2006.01)
*H04L 29/08* (2006.01)

(52) U.S. Cl.
CPC ........ *H04L 63/0884* (2013.01); *H04L 63/306* (2013.01); *H04L 67/12* (2013.01)

(58) Field of Classification Search
USPC ....... 709/203, 204, 206, 217, 219, 223, 224, 709/226, 245
See application file for complete search history.

(56) References Cited

U.S. PATENT DOCUMENTS

| 2008/0281983 | A1* | 11/2008 | Cooley | H04L 63/145 709/245 |
| 2009/0327421 | A1* | 12/2009 | Fu | G06F 16/958 709/204 |
| 2014/0244830 | A1* | 8/2014 | Smacinih | H04L 67/22 709/224 |
| 2016/0088023 | A1* | 3/2016 | Handa | G06F 16/957 709/219 |
| 2017/0092060 | A1* | 3/2017 | Toohey | G07F 17/3244 |

* cited by examiner

*Primary Examiner* — Quang N Nguyen
(74) *Attorney, Agent, or Firm* — Greenberg Traurig LLP

(57) ABSTRACT

Systems and methods for intercepting WebView traffic are disclosed. In one embodiment, a mobile electronic device comprising at least one computer processor executing a mobile application including a WebView application, a method for intercepting WebView traffic may include: (1) replacing, at startup, a default XMLHTTPRequest object with a custom XMLHTTPRequest object; (2) receiving a request for an organization's REST services that requires a secure connection; and (3) processing the request using the custom XMLHTTPRequest object, comprising: (a) determining that the mobile electronic device has a secure connection to the REST services; (b) executing a secure call to the REST services using a mobile component library; and (c) receiving a response from the REST services.

9 Claims, 2 Drawing Sheets

SYSTEMS AND METHODS FOR INTERCEPTING WEBVIEW TRAFFIC

BACKGROUND OF THE INVENTION

1. Field of the Invention

The present disclosure generally relates to systems and methods intercepting WebView traffic.

2. Description of the Related Art

The Android Software Developers Kit (SDK) from Google prohibits the interception of web traffic from the WebView component. Certain secure applications, however, require encryption over and above what regular Transport Layer Security (TLS) encryption offers.

SUMMARY OF THE INVENTION

Systems and methods for intercepting WebView traffic are disclosed. In one embodiment, a mobile electronic device comprising at least one computer processor executing a mobile application including a WebView application, a method for intercepting WebView traffic may include: (1) replacing, at startup, a default XMLHTTPRequest object with a custom XMLHTTPRequest object; (2) receiving a request for an organization's REST services that requires a secure connection; and (3) processing the request using the custom XMLHTTPRequest object, comprising: (a) determining that the mobile electronic device has a secure connection to the REST services; (b) executing a secure call to the REST services using a mobile component library; and (c) receiving a response from the REST services.

In one embodiment, the step of replacing, at startup, a default XMLHTTPRequest with a custom XMLHTTPRequest object may include renaming the default XMLHTTPRequest object; and loading the custom XMLHTTPRequest object.

In one embodiment, the mobile application may be a Spectrum-based mobile application.

In one embodiment, the custom XMLHTTPRequest may include a Spectrum XMLHTTPRequest.

In one embodiment, a JavaScript bridge may determine that the mobile electronic device has a secure connection to the REST services; may execute the secure call to the REST services using the mobile component library; and may receive the response from the REST services.

According to another embodiment, in a mobile electronic device comprising at least one computer processor executing a mobile application including a WebView application, a method for intercepting WebView traffic may include: (1) replacing, at startup, a default XMLHTTPRequest object with a custom XMLHTTPRequest object; (2) receiving a request for an organization's REST services that requires a secure connection; and (3) processing the request using the custom XMLHTTPRequest object, comprising: (a) determining that the mobile electronic device does not have a secure connection to the REST services; and (b) retrieving a cached response.

In one embodiment, the step of replacing, at startup, a default XMLHTTPRequest with a custom XMLHTTPRequest object may include renaming the default XMLHTTPRequest object; and loading the custom XMLHTTPRequest object.

In one embodiment, the mobile application may be a Spectrum-based mobile application.

In one embodiment, the custom XMLHTTPRequest may include a Spectrum XMLHTTPRequest.

In one embodiment, a JavaScript bridge may determine that the mobile electronic device does not have a secure connection to the REST services, and may retrieve the cached response.

According to another embodiment, a system for intercepting WebView traffic may include a mobile electronic device comprising at least one computer processor, the mobile electronic device executing a mobile application including a WebView application, and a REST service for an organization. The WebView application may replace at startup, a default XMLHTTPRequest object with a custom XMLHTTPRequest object, and may receive a request for an organization's REST services that requires a secure connection. A Spectrum-based bridge may process the request using the custom XMLHTTPRequest object by determining whether the mobile electronic device has a secure connection to the REST services; executing a secure call to the REST services using a mobile component library, and receiving a response from the REST services in response to the mobile electronic device having a secure connection; or retrieving a cached response in response to the mobile electronic device not having a secure connection.

In one embodiment, the WebView application may rename the default XMLHTTPRequest object and load the custom XMLHTTPRequest object.

In one embodiment, the mobile application may be a Spectrum-based mobile application.

In one embodiment, the custom XMLHTTPRequest may include a Spectrum XMLHTTPRequest.

In one embodiment, a JavaScript bridge may determine whether the mobile electronic device has a secure connection to the REST services.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein relate to systems and methods for intercepting WebView traffic.

Embodiments may use a wrapper over an XMLHttpRequest (XHR) object that overrides the default XHR behavior. Thus, instead of traffic from a caller being communicated over a default route, the traffic is sent over a native code layer that may send the traffic through a secure which channels it through a secure transport layer for additional encryption. Upon receipt, the traffic may be decrypted and a response may be provided. The caller may be unaware that the traffic is being intercepted and handled in this manner.

Figure 1:
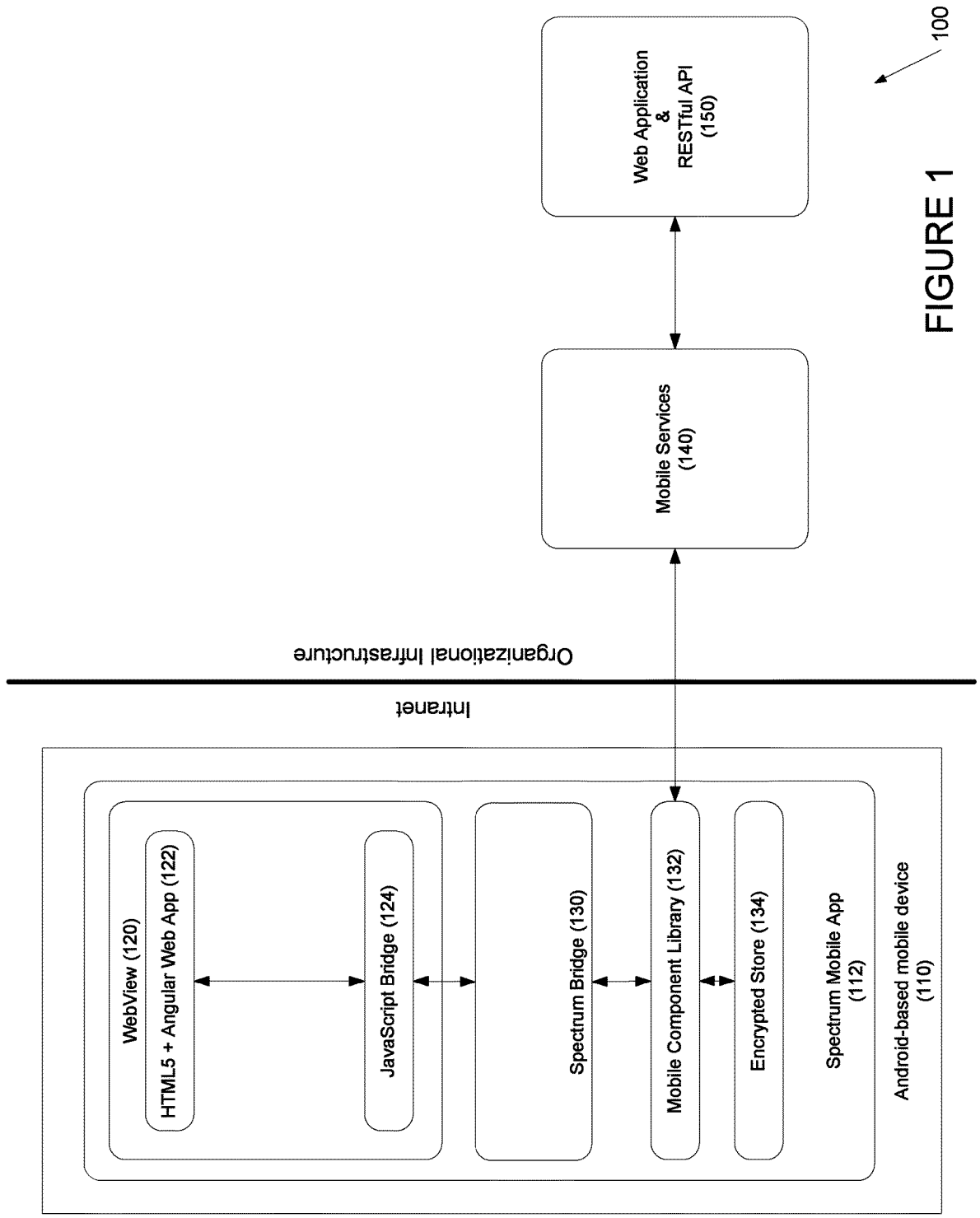
FIG. 1 depicts a system for intercepting WebView traffic according to one embodiment.

Referring to FIG. 1, a system for intercepting WebView traffic is disclosed according to one embodiment. System 100 may include mobile electronic device 110, which may be an Android-based mobile electronic device. Examples of suitable mobile electronic devices 100 include smartphones, tablet computers, notebook computers, smart watches, Internet of Things appliances, etc.

Mobile electronic device 110 may execute mobile application 112, which may be based on the Spectrum framework.

Spectrum mobile application 112 may load a target web application URL using WebView application 120, which may include HTML5+Angular Web App 122 and JavaScript bridge 124. In one embodiment, Spectrum JavaScript bridge 124 may replace an existing XMLHttpRequest (e.g., XHR) object with a custom XHR object that reroutes the calls to a native layer of Spectrum Bridge 130. For example, when loaded, Spectrum XHR will detect it is running in a WebView, and will replace the existing XHR object with a XHR object that interacts with Spectrum bridge 130.

Spectrum mobile application 112 may also execute Spectrum Bridge code 130, which may determine whether mobile device 110 is online with an organization's infrastructure (e.g., mobile services 140 and web application and RESTful API 150). Spectrum bridge 130 may also capture user activity, and store custom secure key-values.

Spectrum mobile application 112 may also include mobile component library 132, which may hold requests made by web application and RESTful AP 150, and the corresponding response. Mobile component library 132 may provide a custom key-value store.

Spectrum mobile application 112 may also provide encrypted store 134, which may store encrypted data.

In one embodiment, mobile electronic device 110 may be outside of an organizational infrastructure. Mobile component library 132 may communicate with the organizational infrastructure using the organization's mobile services 140 and its web application and RESTful API 150. In one embodiment, mobile component library 132 and mobile services 140 may communicate using TLS with the payload encrypted.

Figure 2:
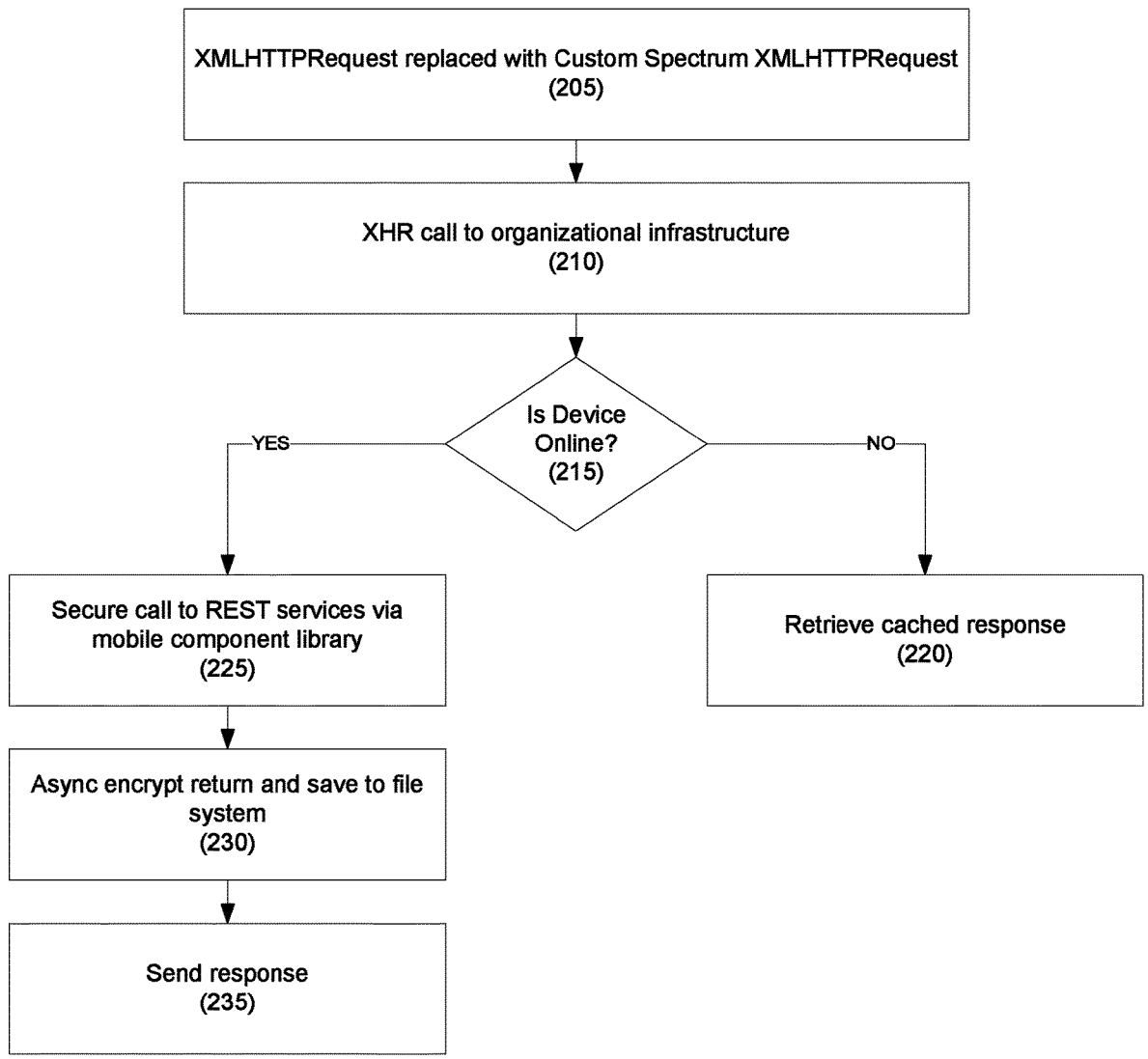
FIG. 2 depicts a method for intercepting WebView traffic according to one embodiment.

Referring to FIG. 2, a method for intercepting WebView traffic is disclosed according to one embodiment. In step 205, at startup, a WebView-hosted web application may replace the default XMLHTTPRequest (e.g., XHR) object with a custom Spectrum XMLHTTPRequest object. In one embodiment, a Spectrum JavaScript bridge within the WebView web application may rename the default XMLHTTPRequest object, may create the custom XMLHTTPRequest object, and may replace the default XMLHTTPRequest object with the custom implementation.

Exemplary code for this step is as follows:

window.XMLHttpRequestOriginal=window.XMLHttpRequest;

This code assigns the original XHR object to a variable call, XMLHttpRequestOriginal. Following this, the custom XMLHTTPRequest object may be loaded using the following exemplary code:

window.XMLHttpRequest=ajax_override2.default.

Note that the file (ajax_override2.default) is exemplary only.

In step 215, a check may be made to see if the mobile electronic device is online and/or that the device has a secure connection to the organizational infrastructure. In one embodiment, the Spectrum Bridge may perform this check. If it is not, in step 220, a cached response may be retrieved and returned using the WebView application. For example, the response that was cached when the last successful request was made may be provided.

If the mobile electronic device is online, in step 225, the native layer of the Spectrum Bridge may make a secure call to the organization's RESTful services via the mobile component library within the spectrum mobile app. When the response is received from the organizational infrastructure, in step 230, the response may be encrypted and saved to the mobile electronic devices file system. The response may then be provided to the Web application.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for intercepting WebView traffic comprising:
in a mobile electronic device comprising at least one computer processor executing a mobile application including a WebView application:
replacing, at startup, a default XMLHTTPRequest object with a custom XMLHTTPRequest object;
receiving a request for an organization's REST services that requires a secure connection; and
processing the request using the custom XMLHTTPRequest object, comprising:
determining that the mobile electronic device has a secure connection to the REST services;
executing a secure call to the REST services using a mobile component library; and
receiving a response from the REST services;
wherein the step of replacing, at startup, a default XMLHTTPRequest object with a custom XMLHTTPRequest object comprises: renaming the default XMLHTTPRequest object; and loading the custom XMLHTTPRequest object;
wherein the mobile application is a Spectrum-based mobile application.

2. The method of claim 1, wherein the custom XMLHTTPRequest comprises a Spectrum XMLHTTPRequest.

3. The method of claim 1, wherein a JavaScript bridge determines that the mobile electronic device has a secure connection to the REST services; executes the secure call to the REST services using the mobile component library; and receives the response from the REST services.

4. A method for intercepting WebView traffic comprising:
in a mobile electronic device comprising at least one computer processor executing a mobile application including a WebView application:
replacing, at startup, a default XMLHTTPRequest object with a custom XMLHTTPRequest object;
receiving a request for an organization's REST services that requires a secure connection; and
processing the request using the custom XMLHTTPRequest object, comprising:
determining that the mobile electronic device does not have a secure connection to the REST services; and
retrieving a cached response;
wherein the step of replacing, at startup, a default XMLHttpRequest object with a custom XMLHttpRequest object comprises: renaming the default XMLHTTPRequest object; and loading the custom XMLHttpRequest object;
wherein the mobile application is a Spectrum-based mobile application.

5. The method of claim 4, wherein the custom XMLHTTPRequest comprises a Spectrum XMLHTTPRequest.

6. The method of claim 4, wherein a JavaScript bridge determines that the mobile electronic device does not have a secure connection to the REST services; and retrieves the cached response.

7. A system for intercepting WebView traffic comprising:
a mobile electronic device comprising at least one computer processor, the mobile electronic device executing a mobile application including a WebView application; and
a REST service for an organization;
wherein:
the WebView application replaces at startup, a default XMLHTTPRequest object with a custom XMLHTTPRequest object;
the WebView application receives a request for an organization's REST services that requires a secure connection; and
a Spectrum-based bridge processes the request using the custom XMLHTTPRequest object by:
determining whether the mobile electronic device has a secure connection to the REST services;
executing a secure call to the REST services using a mobile component library, and receiving a response from the REST services in response to the mobile electronic device having a secure connection; or
retrieving a cached response in response to the mobile electronic device not having a secure connection;
wherein the WebView application renames the default XMLHTTPRequest object and loads the custom XMLHttpRequest object;
wherein the mobile application is a Spectrum-based mobile application.

8. The system of claim 7, wherein the custom XMLHTTPRequest comprises a Spectrum XMLHTTPRequest.

9. The system of claim 7, wherein a JavaScript bridge determines whether the mobile electronic device has a secure connection to the REST services.

* * * * *